(12) United States Patent
Subramanian et al.

(10) Patent No.: US 8,396,847 B2
(45) Date of Patent: Mar. 12, 2013

(54) SYSTEM AND METHOD TO RETRIEVE AND ANALYZE DATA FOR DECISION MAKING

(75) Inventors: Chandramohan Subramanian, Charlotte, NC (US); Michael P. Galloway, Charlotte, NC (US); Jeffrey J. Potts, Charlotte, NC (US); Brian Stump, Huntersville, NC (US); James Krell, Roanoke, VA (US)

(73) Assignee: Bank of America Corporation, Charlotte, NC (US)

( * ) Notice: Subject to any disclaimer, the term of this patent is extended or adjusted under 35 U.S.C. 154(b) by 901 days.

(21) Appl. No.: 10/463,073

(22) Filed: Jun. 17, 2003

(65) Prior Publication Data
US 2004/0267704 A1 Dec. 30, 2004

(51) Int. Cl.
G06F 7/00 (2006.01)
G06F 17/30 (2006.01)

(52) U.S. Cl. ..................................... 707/705
(58) Field of Classification Search .............. 707/1–206, 707/705
See application file for complete search history.

(56) References Cited

U.S. PATENT DOCUMENTS

| | | | | |
|---|---|---|---|---|
| 5,809,238 A * | 9/1998 | Greenblatt et al. | ............ | 709/202 |
| 5,940,804 A * | 8/1999 | Turley et al. | ............ | 705/9 |
| 6,345,288 B1 * | 2/2002 | Reed et al. | ............ | 709/201 |
| 6,360,219 B1 * | 3/2002 | Bretl et al. | ............ | 1/1 |
| 6,499,036 B1 * | 12/2002 | Gurevich | ............ | 707/103 R |
| 6,741,174 B2 * | 5/2004 | Rhoades et al. | ............ | 340/540 |
| 6,988,134 B2 * | 1/2006 | Thorpe et al. | ............ | 709/223 |
| 7,047,251 B2 * | 5/2006 | Reed et al. | ............ | 1/1 |
| 7,272,144 B2 * | 9/2007 | Cloonan et al. | ............ | 370/395.42 |
| 8,032,561 B1 * | 10/2011 | Nadj et al. | ............ | 707/799 |
| 2002/0049767 A1 * | 4/2002 | Bennett | ............ | 707/104.1 |
| 2002/0087385 A1 * | 7/2002 | Vincent | ............ | 705/10 |
| 2002/0147726 A1 * | 10/2002 | Yehia et al. | ............ | 707/101 |
| 2003/0200527 A1 * | 10/2003 | Lynn et al. | ............ | 717/102 |
| 2003/0212654 A1 * | 11/2003 | Harper et al. | ............ | 707/1 |
| 2004/0001493 A1 * | 1/2004 | Cloonan et al. | ............ | 370/395.42 |
| 2004/0030667 A1 * | 2/2004 | Xu et al. | ............ | 707/1 |
| 2004/0078105 A1 * | 4/2004 | Moon et al. | ............ | 700/100 |
| 2004/0120332 A1 * | 6/2004 | Hendel | ............ | 370/411 |
| 2004/0176864 A1 * | 9/2004 | Cocco et al. | ............ | 700/108 |
| 2005/0144189 A1 * | 6/2005 | Edwards et al. | ............ | 707/102 |
| 2005/0223025 A1 * | 10/2005 | Bennett, Jr. | ............ | 707/102 |

OTHER PUBLICATIONS

W.O. Clark & L.L. Shannon, "A Dual Structured Data Base System", Nov. 1973, ACM Press, vol. 10, 9 Issue 1, 3, p. 139.*

* cited by examiner

Primary Examiner — Mariela Reyes
Assistant Examiner — Michael Pham
(74) Attorney, Agent, or Firm — Michael A. Springs; Moore & Van Allen PLLC; Andrew D. Gerschutz

(57) ABSTRACT

A system to retrieve and analyze data may include at least one data collection engine to operate on a processor and to retrieve selected data related to an inquiry from at least one data source. The system may also include at least one rules engine to operate on the processor or another processor to apply predetermined functions to the selected data to respond to the inquiry.

54 Claims, 6 Drawing Sheets

SYSTEM AND METHOD TO RETRIEVE AND ANALYZE DATA FOR DECISION MAKING

CROSS-REFERENCE TO COMPUTER PROGRAM LISTING APPENDIX

A portion of the present disclosure is contained in a compact disc, computer program listing appendix. The compact disc contains the MS-DOS files listed in the following table that includes the title, date of creation and the size in bytes for each file. The contents of each of these files are incorporated herein by reference. Any reference to "the appendix" or any of the files in this specification refer to the files contained on the compact disc. The files are contained within a folder named "Capire Source" and sub-folders.

| TITLE | DATE OF CREATION | SIZE IN BYTES |
|---|---|---|
| Activator.txt | May 2, 2003 | 21,693 |
| AdaptiveFastExport.txt | May 2, 2003 | 18,367 |
| AdjustTableProperties.txt | May 2, 2003 | 26,123 |
| AggregationDerivation.txt | May 2, 2003 | 881 |
| AggregationEvaluator.txt | May 2, 2003 | 10,334 |
| AllocationFailureException.txt | May 2, 2003 | 235 |
| Assert.txt | May 2, 2003 | 1,213 |
| AtomicVariable.txt | May 2, 2003 | 4,581 |
| Base64.txt | May 2, 2003 | 3,831 |
| CalculationExecutor.txt | May 2, 2003 | 14,874 |
| Capire.txt | May 2, 2003 | 18,078 |
| CapireProcess.txt | May 2, 2003 | 19,929 |
| CapireResults.txt | May 2, 2003 | 16,445 |
| CapireThreadStatusObject.txt | May 2, 2003 | 2,121 |
| CapireUnit.txt | May 2, 2003 | 3,044 |
| CheckBase64.txt | May 2, 2003 | 2,162 |
| CheckPoint.txt | May 2, 2003 | 12,627 |
| Column.txt | May 2, 2003 | 607 |
| CombineTableDefinitions.txt | May 2, 2003 | 26,248 |
| CombineTables.txt | May 2, 2003 | 2,938 |
| ComputationStatistics.txt | May 2, 2003 | 2,027 |
| ComputedValue.txt | May 2, 2003 | 15,013 |
| CompValRow.txt | May 2, 2003 | 15,049 |
| CompValRowColumn.txt | May 2, 2003 | 11,531 |
| ConditionalDerivation.txt | May 2, 2003 | 769 |
| ConnectionCheck.txt | May 2, 2003 | 147 |
| ConnectionPool.txt | May 2, 2003 | 3,458 |
| ConvertToken.txt | May 2, 2003 | 3,730 |
| CreateFastExportControlFile.txt | May 2, 2003 | 17,813 |
| Customer.txt | May 2, 2003 | 5,508 |
| CustomerDataObjectPooler.txt | May 2, 2003 | 4,933 |
| CustomerRecommendation.txt | May 2, 2003 | 5,751 |
| CustomerResultNLP.txt | May 2, 2003 | 970 |
| DataConnection.txt | May 2, 2003 | 556 |
| DataLoaderManagerImpl.txt | May 2, 2003 | 29,944 |
| DataPersistenceManagerImpl.txt | May 2, 2003 | 22,283 |
| DataProviderManagerImpl.txt | May 2, 2003 | 479 |
| DefaultCapireOutputModule.txt | May 2, 2003 | 12,079 |
| DefaultCapireOutputModuleEarlyVersion.txt | May 2, 2003 | 10,047 |
| DefaultXmlOutputFileDescription.txt | May 2, 2003 | 248 |
| DefaultXmlWriter.txt | May 2, 2003 | 2,741 |
| DerivationManagerImpl.txt | May 2, 2003 | 1,342 |
| DerivedVariable.txt | May 2, 2003 | 6,532 |
| DisplayConnectioinProperties.txt | May 2, 2003 | 44,397 |
| Fail.txt | May 2, 2003 | 226 |
| FormulaDerivation.txt | May 2, 2003 | 1,023 |
| FormulaEvaluator.txt | May 2, 2003 | 17,085 |
| FormulaParser.txt | May 2, 2003 | 18,073 |
| FormulaTemplate.txt | May 2, 2003 | 8,820 |
| GeneratePropertiesSli.txt | May 2, 2003 | 4,417 |
| GraphAnalyzer.txt | May 2, 2003 | 16,637 |
| ICustomerResult.txt | May 2, 2003 | 201 |
| IDataLoaderManager.txt | May 2, 2003 | 636 |
| IDataPersistenceManager.txt | May 2, 2003 | 1,593 |
| IDataProviderManager.txt | May 2, 2003 | 250 |
| IdentityKey.txt | May 2, 2003 | 11,577 |
| IDerivationManager.txt | May 2, 2003 | 976 |
| IModelManager.txt | May 2, 2003 | 1,208 |
| InterpretRelIdLevelRollUp.txt | May 2, 2003 | 13,043 |
| IScoreManager.txt | May 2, 2003 | 343 |
| Item.txt | May 2, 2003 | 1,477 |
| IVariableManager.txt | May 2, 2003 | 782 |
| JDBCDemo.txt | May 2, 2003 | 9,143 |
| JDBCDemo.txt | May 2, 2003 | 404 |
| Key.txt | May 2, 2003 | 1,426 |
| Math_stack.txt | May 2, 2003 | 15,735 |
| Model.txt | May 2, 2003 | 3,190 |
| Model.txt | May 2, 2003 | 22,375 |
| ModelParameters.txt | May 2, 2003 | 2,172 |
| ModelScoringFramework.txt | May 2, 2003 | 2,375 |
| MSAAssertionFailureException.txt | May 2, 2003 | 416 |
| MsaBuildLevel.txt | May 2, 2003 | 659 |
| MSALogFailureException.txt | May 2, 2003 | 617 |
| MsaLogWriter.txt | May 2, 2003 | 9,517 |
| MSAModels.txt | May 2, 2003 | 17,355 |
| MsaNullLogWriter.txt | May 2, 2003 | 1,359 |
| MSASingletonException.txt | May 2, 2003 | 557 |
| NameValue.txt | May 2, 2003 | 470 |
| NLPInterpretationParameters.txt | May 2, 2003 | 11,797 |
| NLPModel.txt | May 2, 2003 | 14,764 |
| ObjectFactory.txt | May 2, 2003 | 11,230 |
| ObjectFactory.txt | May 2, 2003 | 12,757 |
| ObjectFactory.txt | May 2, 2003 | 10,463 |
| ObjectFactory.txt | May 2, 2003 | 10,460 |
| Pair.txt | May 2, 2003 | 1,337 |
| ParseInputStringToList.txt | May 2, 2003 | 5,744 |
| Pass.txt | May 2, 2003 | 224 |
| Process.CDO.txt | May 2, 2003 | 16,335 |
| ProcessCDOforWestModels.txt | May 2, 2003 | 15,956 |
| ProcessingUnit.txt | May 2, 2003 | 13,783 |
| QueryDispatcher.txt | May 2, 2003 | 6,456 |
| QueryExecutor.txt | May 2, 2003 | 9,990 |
| RangeDerivation.txt | May 2, 2003 | 1,161 |
| RangeEvaluator.txt | May 2, 2003 | 14,358 |
| RangeInterval.txt | May 2, 2003 | 2,566 |
| RankScores.txt | May 2, 2003 | 18,113 |
| ReadMeVersion103.txt | May 2, 2003 | 3,708 |
| ReadyToComputeQuery.txt | May 2, 2003 | 2,360 |
| RunTimeManager.txt | May 2, 2003 | 5,238 |
| RunTimeParms.txt | May 2, 2003 | 32,072 |
| ScoreInterpretationFramework.txt | May 2, 2003 | 165 |
| ScoreManagerImpl.txt | May 2, 2003 | 434 |
| SingletonDataPersistanceManagerImpl.txt | May 2, 2003 | 446 |
| SliCustomerRecommendation.txt | May 2, 2003 | 6,492 |
| SLIInterpretationParameters.txt | May 2, 2003 | 11,895 |
| SliProcessCDO.txt | May 2, 2003 | 2,946 |
| SliProcessCDObackup.txt | May 2, 2003 | 12,086 |
| SliScoreParameters.txt | May 2, 2003 | 3,991 |
| SQLFactory.txt | May 2, 2003 | 39,181 |
| StatsObject.txt | May 2, 2003 | 1,013 |
| Std.txt | May 2, 2003 | 2,608 |
| StringPadder.txt | May 2, 2003 | 1,777 |
| Table.txt | May 2, 2003 | 3,786 |
| TableInversion.txt | May 2, 2003 | 7,757 |
| TeradataDemo.txt | May 2, 2003 | 10,771 |
| TeradataFormatSample.txt | May 2, 2003 | 9,431 |
| TeradataMultiLoadSample.txt | May 2, 2003 | 11,216 |
| TeradataQuantiles.txt | May 2, 2003 | 5,448 |
| TimingStats.txt | May 2, 2003 | 1,483 |
| UnitIdentity.txt | May 2, 2003 | 13,466 |
| UnloadProcess.txt | May 2, 2003 | 808 |
| UserInfo.txt | May 2, 2003 | 1,416 |
| ValidationUtility.txt | May 2, 2003 | 53,056 |
| VariableFactory.txt | May 2, 2003 | 43,554 |
| VariableHierarchy.txt | May 2, 2003 | 11,796 |
| VariableManagerImpl.txt | May 2, 2003 | 1,351 |
| VariableNotFountException.txt | May 2, 2003 | 258 |
| VariableValue.txt | May 2, 2003 | 11,086 |
| VariableValueFactory.txt | May 2, 2003 | 13,375 |
| Visualizer.txt | May 2, 2003 | 12,870 |
| WebDemo.txt | May 2, 2003 | 7,699 |
| WhatChanged.txt | May 2, 2003 | 5,801 |
| XmlAggregation.txt | May 2, 2003 | 14,153 |
| XmlCapireUnit.txt | May 2, 2003 | 12,656 |

-continued

| TITLE | DATE OF CREATION | SIZE IN BYTES |
|---|---|---|
| XmlColumn.txt | May 2, 2003 | 10,639 |
| XmlConditional.txt | May 2, 2003 | 13,474 |
| XmlDataConnection.txt | May 2, 2003 | 11,806 |
| XmlDataSource.txt | May 2, 2003 | 17,500 |
| XmlDerivation.txt | May 2, 2003 | 17,785 |
| XmlFail.txt | May 2, 2003 | 10,726 |
| XmlFormula.txt | May 2, 2003 | 11,836 |
| XmlItem.txt | May 2, 2003 | 13,594 |
| XmlJoin.txt | May 2, 2003 | 11,760 |
| XmlKey.txt | May 2, 2003 | 15,191 |
| XmlLeft.txt | May 2, 2003 | 11,008 |
| XmlModel.txt | May 2, 2003 | 16,073 |
| XmlPair.txt | May 2, 2003 | 12,100 |
| XmlPass.txt | May 2, 2003 | 10,726 |
| XmlRange.txt | May 2, 2003 | 13,473 |
| XmlRangeInterval.txt | May 2, 2003 | 13,419 |
| XmlRight.txt | May 2, 2003 | 11,028 |
| XmlSelectColumns.txt | May 2, 2003 | 12,039 |
| XmlTable.txt | May 2, 2003 | 17,728 |
| XmlTimeSeries.txt | May 2, 2003 | 18,878 |
| XmlVariable.txt | May 2, 2003 | 19,140 |
| XmlVariableList.txt | May 2, 2003 | 12,089 |
| XmlWhereColumns.txt | May 2, 2003 | 12,021 |
| ZeroLevelFrame.txt | May 2, 2003 | 1,095 |
| Aggregation.txt | May 1, 2003 | 533 |
| AggregationImp$Unmarshaller.txt | May 1, 2003 | 5,281 |
| AggregationImpl.txt | May 1, 2003 | 26,896 |
| AggregationPanel.txt | May 1, 2003 | 4,372 |
| Capire.txt | May 1, 2003 | 3,413 |
| Column.txt | May 1, 2003 | 573 |
| ColumnImpl.txt | May 1, 2003 | 12,967 |
| DataPanel.txt | May 1, 2003 | 11,246 |
| DataSource.txt | May 1, 2003 | 630 |
| DataSourceImpl.txt | May 1, 2003 | 13,890 |
| DataSourcePanel.txt | May 1, 2003 | 9,667 |
| Derivation.txt | May 1, 2003 | 581 |
| DerivationImpl.txt | May 1, 2003 | 20,804 |
| DerivedPanel.txt | May 1, 2003 | 17,224 |
| DetailPan.txt | May 1, 2003 | 7,368 |
| Formula.txt | May 1, 2003 | 445 |
| FormulaImpl.txt | May 1, 2003 | 10,537 |
| FormulaPanel.txt | May 1, 2003 | 7,344 |
| Item.txt | May 1, 2003 | 773 |
| ItemImpl.txt | May 1, 2003 | 23,153 |
| jaxb.txt | May 1, 2003 | 95 |
| Join.txt | May 1, 2003 | 442 |
| JoinImpl.txt | May 1, 2003 | 10,507 |
| Left.txt | May 1, 2003 | 575 |
| LeftImpl.txt | May 1, 2003 | 12,452 |
| Model.txt | May 1, 2003 | 783 |
| ModelImpl.txt | May 1, 2003 | 19,141 |
| ModelInfo.txt | May 1, 2003 | 1,190 |
| ModelPan.txt | May 1, 2003 | 23,525 |
| ModVarListPanel.txt | May 1, 2003 | 23,121 |
| MSAModels.txt | May 1, 2003 | 604 |
| MSAModelsImpl.txt | May 1, 2003 | 12,269 |
| ObjectFactory.txt | May 1, 2003 | 17,607 |
| Pair.txt | May 1, 2003 | 661 |
| PairImpl.txt | May 1, 2003 | 11,271 |
| Range.txt | May 1, 2003 | 542 |
| RangeImpl.txt | May 1, 2003 | 14,287 |
| RangeInterval.txt | May 1, 2003 | 802 |
| RangeIntervalImpl.txt | May 1, 2003 | 17,379 |
| RangePanel.txt | May 1, 2003 | 8,035 |
| README.txt | May 1, 2003 | 1,173 |
| ReadXml.txt | May 1, 2003 | 2,242 |
| Right.txt | May 1, 2003 | 576 |
| RightImpl.txt | May 1, 2003 | 12,472 |
| SelectColumns.txt | May 1, 2003 | 453 |
| SelectColumnsImpl.txt | May 1, 2003 | 10,627 |
| ShowModel.txt | May 1, 2003 | 13,410 |
| ShowModelApplet.txt | May 1, 2003 | 6,626 |
| SLI_2003_Structure.txt | May 1, 2003 | 42,113 |
| Table.txt | May 1, 2003 | 1,058 |
| TableImpl.txt | May 1, 2003 | 29,351 |
| TimeSeries.txt | May 1, 2003 | 1,107 |
| TimeSeriesImpl.txt | May 1, 2003 | 31,081 |
| Variable.txt | May 1, 2003 | 761 |
| VariableImpl.txt | May 1, 2003 | 26,046 |
| VariableList.txt | May 1, 2003 | 454 |
| VariableListImpl.txt | May 1, 2003 | 10,651 |
| WhereColumns.txt | May 1, 2003 | 452 |
| WhereColumnsImpl.txt | May 1, 2003 | 10,617 |

A portion of the disclosure of this patent document contains material that is subject to copyright protection. The copyright owner has no objection to the facsimile reproduction by anyone of the patent document, the appendix, or the patent disclosure, as it appears in the Patent and Trademark Office patent files or records, but otherwise reserves all copyright rights whatsoever.

FIELD OF THE INVENTION

The present invention relates to retrieving and analyzing data from data sources or the like, and more particularly to a system and method to retrieve and analyze data for decision making, business purposes or for other purposes.

BACKGROUND

Nearly all of our activities may in some way be recorded and stored electronically in data sources or the like. This is particularly true with respect to business dealings or transactions between business entities and between business entities and customers. Analyzing a business entity's or customer's past and current interactions with a business, such as a bank or other business, combined with other statistical information, may enable a business entity to make informed inferences or decisions about another business entity's or customer's needs, possible future actions or profitability measures. The analytical and decision-making activities may involve retrieving data from a plethora of different sources and applying a multitude of different processes to the retrieved data. The data may have to be interpreted and transformed or derived from one form to another. The inherent nature of most business environments is that the processing and interpreting rules or procedures may be constantly changing. Another dimension to this complex problem is that the sources from which the data may be obtained may also be dynamic and may change significantly. This means that custom code or analytical software needs to be developed or modifications made to existing code for each rule and rule change as well as for each data source and change in the data source. Extensive and ongoing modification increases the possibility of injecting bugs or faults in the applications and such applications have high maintenance demands. The software changes can bring other elements into play, such as change management, extensive regression testing encompassing verification and validation, implementation of the software into production and the like. Software applications of this nature, with a high propensity for changes at a high frequency, are likely to become less maintainable with each release and have a high probability of potential bugs or faults.

Accordingly, there is a need to provide a system and method to retrieve and analyze data that requires minimal if any modification to the code when rules or ways of doing business change or when sources of data change. There is also a need to provide a system and method to retrieve and analyze data that has broad scope applicability with minimal if any modification from one application or environment to another. There is also a need to provide a system and method to retrieve and analyze data that is modular such that any changes to one module will not affect another.

SUMMARY

In accordance with an embodiment of the present invention, a system to retrieve and analyze data may include at least one data collection engine to operate on a processor and to retrieve selected data related to an inquiry from at least one data source. The system may also include at least one rules engine to operate on the processor or another processor to apply predetermined functions or rules to the selected data to respond to the inquiry.

In accordance with another embodiment of the present invention, a system to retrieve and evaluate data may include a plurality of data collection engines. Each data collection engine may operate on a processor or one of a plurality of processors and may retrieve selected data related to an inquiry from at least one data source. The system may also include a plurality of rules engines. Each rules engine may operate on the processor or one of the plurality of processors to evaluate the selected data to respond to the inquiry. A ready to compute queue may be provided to hold the selected data for processing by a next available rules engine.

In accordance with another embodiment of the present invention, a method to retrieve and analyze data may include retrieving selected data related to an inquiry from at least one data source. The method may also include holding the selected data in a queue for processing by a next available rules engine and applying predetermined functions to the selected data for analysis.

In accordance with another embodiment of the present invention, a method to retrieve and analyze data may include identifying at least one variable related to information to respond to an inquiry or problem. The method may also include retrieving selected data related to the at least one variable, and processing the selected data to determine values for the at least one variable.

In accordance with another embodiment of the present invention, a computer-readable medium having computer-executable instructions for performing a method that may include retrieving selected data related to an inquiry from at least one data source. The method may also include holding the selected data in a queue for processing by a next available rules engine, and applying predetermined functions to the selected data for analysis.

DESCRIPTION OF THE INVENTION

The following detailed description of preferred embodiments refers to the accompanying drawings which illustrate specific embodiments of the invention. Other embodiments having different structures and operations do not depart from the scope of the present invention.

The present invention provides a framework that may be used to retrieve and analyze data. The framework may be a reusable design expressed as a set of predefined classes and the way in which instances of the classes may collaborate to provide results under different circumstances or situations. The design may be reusable for all or part of a software system. Large scale reuse of object-oriented libraries or data sources requires frameworks. The framework provides a context for the components in the libraries to be reused.

Figure 1:
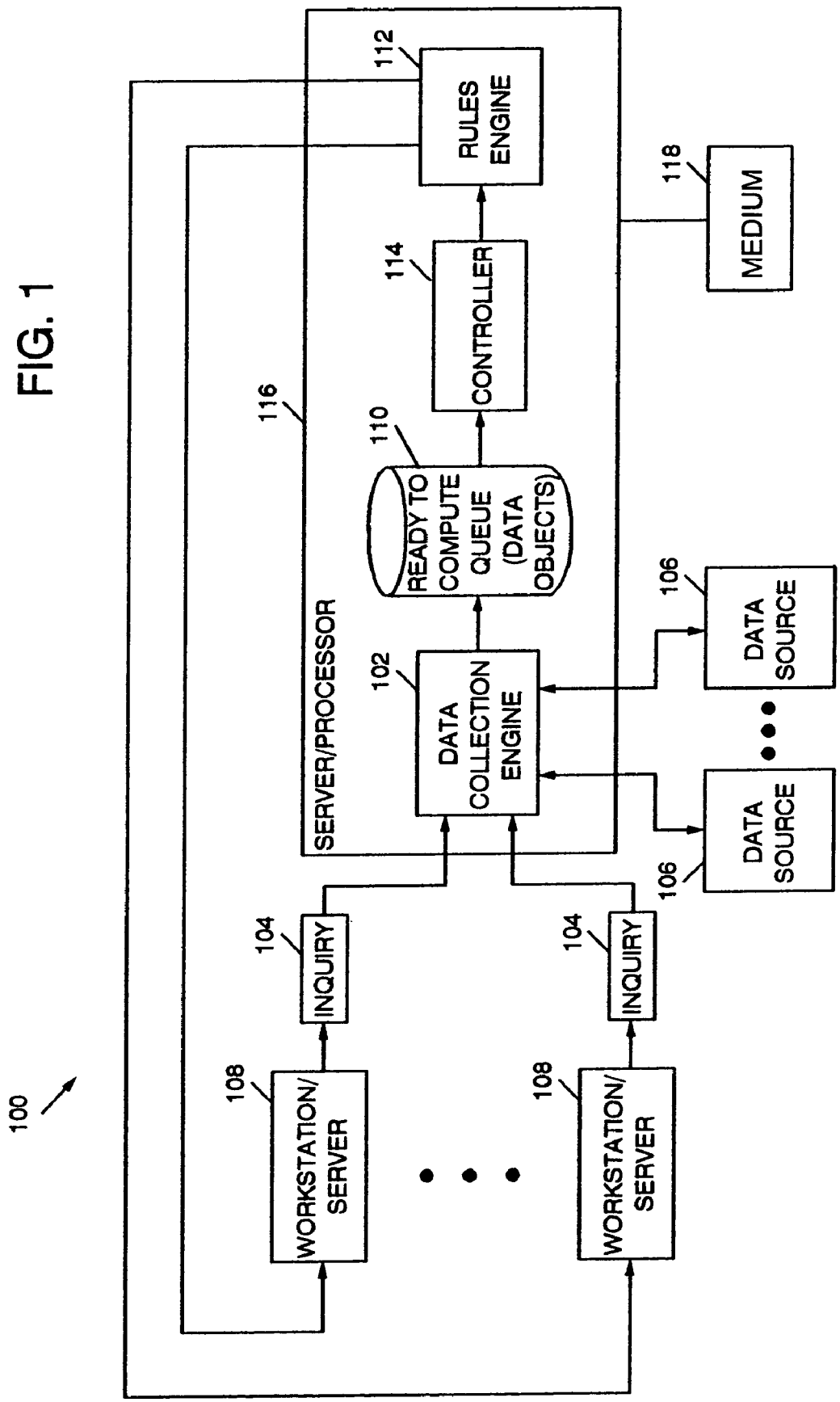
FIG. 1 is a block diagram of a system to retrieve and analyze data in accordance with an embodiment of the present invention.

FIG. 1 is a block diagram of a system 100 to retrieve and analyze data in accordance with an embodiment of the present invention. The system 100 may include a data collection engine 102 to retrieve selected data related to an inquiry 104, such as a business related inquiry, problem or the like, from one or more data sources 106. As used herein, a data source may be anything that provides data, such as relational database tables, applications, user interfaces, middleware or the like. The inquiry 104 may be submitted by a user from a workstation 108, server or the like that is not necessarily part of the system 100. As will be described in more detail below, the system 100 is capable of handling inquiries 104 in an online mode or a batch mode and may also involve distributed computing. An example of an inquiry 104, in a business context, may involve determining which business entities may be interested in a particular product or what product certain business entities may be likely to desire or acquire next. As used herein, business entity may include a customer, client, an account, a household, a product or service, an order for a product or service or the like and these terms may be used interchangeably. Another example of an inquiry 104 may be related to evaluating relationships with business entities, such as level of service, satisfaction with services, segmenting business entities or customers into groups, measurements related to retention of business entities or customers. The selected data related to the inquiry 104 may include which services a business entity or customer is utilizing or which accounts a business entity or customer has, level of activity by the business entity or customer with respect to the service, account balances and length of time the business entity or customer has been using the service. The selected data related to the inquiry 104 may also include other demographics and statistical and non-statistical data associated with business entities or customers and their relationships with other business entities or the like. The present invention may also have applications in contexts or environments other than business to respond to any sort of problem, request or inquiry.

The retrieved data may be stored in a ready to compute queue 110 until a rules engine 112 is ready or available to apply predetermined rules or functions to the selected data to respond to the inquiry 104. The retrieved data may be in the form of a data object that may be stored in the ready to compute queue 110. A controller 114 may interface between the ready to compute queue 110 and the rules engine 112 to monitor and control transfer of the data objects from the ready to compute queue 110 to the next available rules engine 112.

The controller 114 may be a utility application that is part of the ready to compute queue 110 or the rules engine 112. In another embodiment of the present invention the ready to compute queue 110 may not be needed. For example, in a non-batch mode operation, a ready to compute queue may not be needed. The retrieved data may be passed from the data collection engine 102 directly to the controller 114 or to the rules engine 112 for the processing.

The rules engine 112 may be a business rules engine and may apply predetermined functions to the selected data to respond to a business inquiry or problem. The rules engine 112 may be configurable to respond to different types of inquiries, requests or problems. The rules engine 112 may include a data structure to recursively apply the predetermined functions to the selected data or data objects. The predetermined functions may include transformations, derivations, calculations and the like as may be defined in a process definition as discussed in more detail below. The results of the analysis or processing by the rules engine 112 may be returned to the user or requestor at the workstation 108.

The data collection engine 102, ready to compute queue 110, controller 114 and rules engine 112 may operate on one server or processor 116 or may each operate on separate servers or processors. The appendix to this application includes examples of source code that may be used to implement features of the data collection engine 102 and rules engine 112. Features of the data collection engine 102 may be implemented by source code described in files in the appendix such as DataLoadermanagerImpl.txt, SQLFactory.txt and the like. Features of the business rules engine 112 may be implemented by source code described in files in the appendix such as Math_stack.txt, AggregationEvaluator.txt, FormulaEvaluator.txt, RangeEvaluator.txt, Formulaparser.txt and the like.

Figure 2:
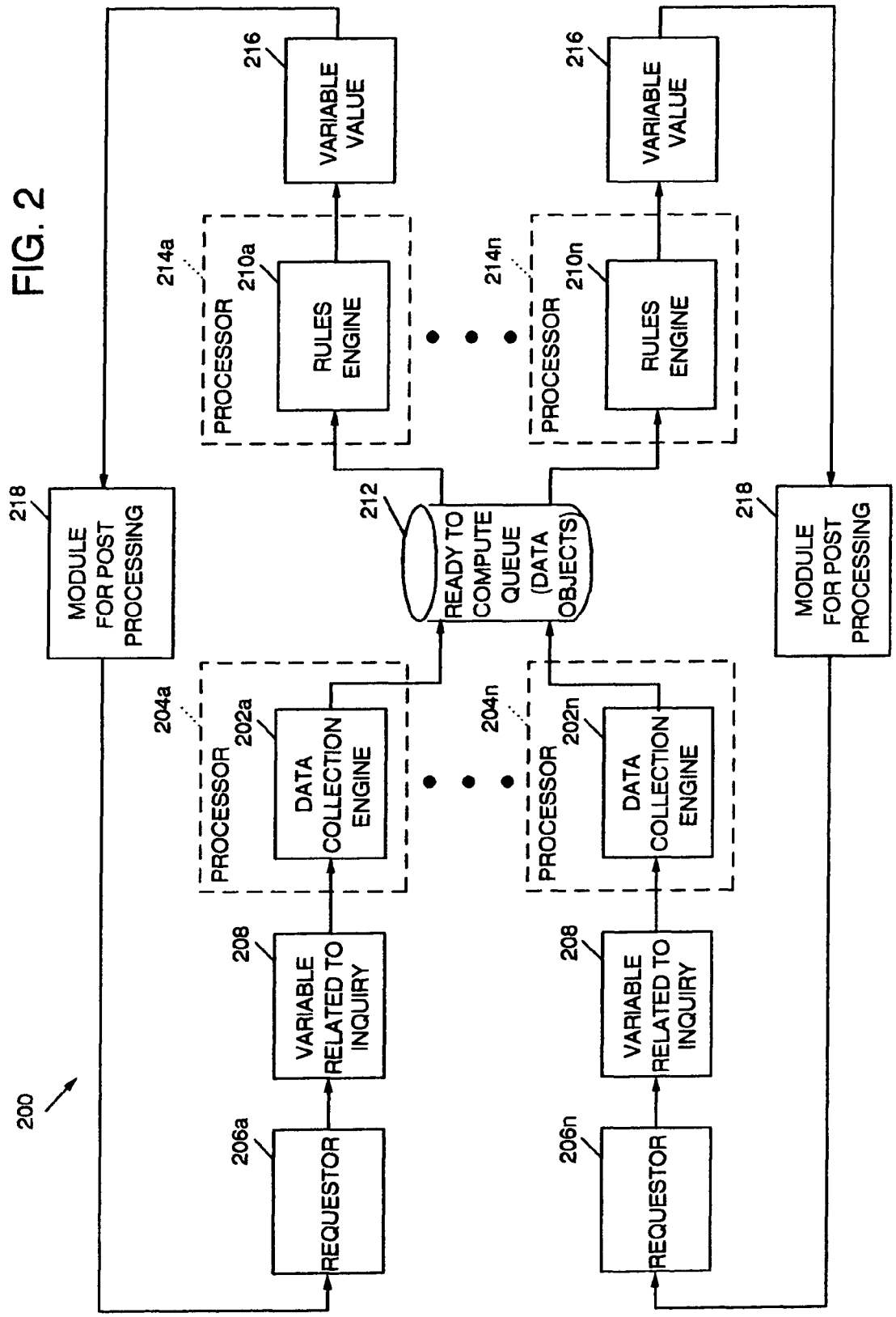
FIG. 2 is a block diagram of a system to retrieve and analyze data in accordance with another embodiment of the present invention.

FIG. 2 is a block diagram of a system 200 to retrieve and analyze data in accordance with another embodiment of the present invention. The system 200 may include a plurality of data collection engines 202a-202n. Each of the data collection engines 202a-202n may operate on separate processors 202a-204n or a selected number of data collection engines 202 may operate on each processor 204. A requestor 206 may submit an inquiry to any of the data collection engines 202a-202n via a workstation or the like, similar to the workstations 108 of FIG. 1. The inquiry may be similar to the inquiry 104 described with respect to FIG. 1. At least one variable 208 related to each inquiry may be defined. A variable 208 may be anything that needs to be evaluated in order to respond to an inquiry. Each variable 208 may be defined as a process definition involving how values for each of the variables 208 may be determined. A process definition may be a collection of related variable definitions. The collective definition of the variables may define a business process. Variables 208 may be shared across different process definitions whenever appropriate. The process definition may include the steps or operations needed to determine the values of each of the variables 208, including the sources from which selected data may be obtained to determine each variable value. Values for some variables 208 may need to be derived or transformed from other data. A variable that is not derived may be referred to as a source variable or atomic variable. Some variables 208 may be formed from sub-variables or require a combination of data from different data sources or tables that may need to be combined in a predetermined way to evaluate the variable 208. Variables 208 may be organized into variable hierarchies. The variables 208 may involve business entity or customer information, demographics, statistical data and non-statistical data.

The process definitions may be embodied in a markup language, such as extensible markup language (XML) or the like. The system 100 or 200 or framework may be made generic by specifying the instructions to retrieve and analyze or evaluate the data in the mark up language or XML process definitions. Because different types of data may be specified and retrieved by the markup language definitions, the framework or system 100 or 200 may be used in different environments or industries and in different applications. The markup language process definitions may generate structured query language (SQL) queries to retrieve the selected data from tables, data sources or the like (not shown in FIG. 2), similar to data sources 106 of FIG. 1, that may be processed by one of the rules engines 210a-210n. The markup language definition of a process holds the business rules on which one of the business rules engines 210a-210n may operate. Because the business rules may also be specified in the markup language definitions, different types of business problems, inquiries or the like may be solved or determined by the present invention. The business rules may include transformations, calculations, derivations or the like to be performed on the retrieved, selected data to respond to the problem or inquiry as defined by the markup language process definitions.

A typical software application may be developed or written using a programming language, such as Java, C++, COBOL, Visual Basic or the like. Programming in such a language typically requires specialized skills and technical background. Business requirements may drive in which programming language a software program or set of related programs may be written or perform. The present invention enables the business rules to be configured using a mark-up language or the like rather than one of the traditional programming languages indicated above to simplify the software development cycle.

After the selected data is retrieved by one of the data collection engines 202a-202n, the selected data may be stored or held in a ready to compute queue 212 for a next available rules engine 210a-210n. The selected data may be stored as a data object in the ready to compute queue 212. While a single ready to compute queue 212 is shown in FIG. 2, the system 200 may include multiple ready to compute queues 212, if needed. Each of the rules engines 210a-210n may operate on a separate processor 214a-214n or server or some predetermined number of rules engines 210a-210n may operate on each processor 214a-214n. Each rules engine 210 may apply predetermined rules or operations to the selected data or data objects to determine a variable value for each variable 208. For example, a birth date may be processed by the rules engine 210 to determine the age of someone, the date of a document, such as a deed or mortgage may be converted to the number of years a person has owned or lived at a particular residence. Similarly, the date of a bill of sale, promissory note or title may be converted to determine how long a person has owned a vehicle or other personal property. The variable value 216 may be returned to the requestor 206 or applied to a module 218 for post processing. The post processing module 218 may include a data structure to interpret the results to fit the inquiry, formulate a business entity or customer list in a particular order based on the results, store the results for further processing or perform other operations.

Figure 3:
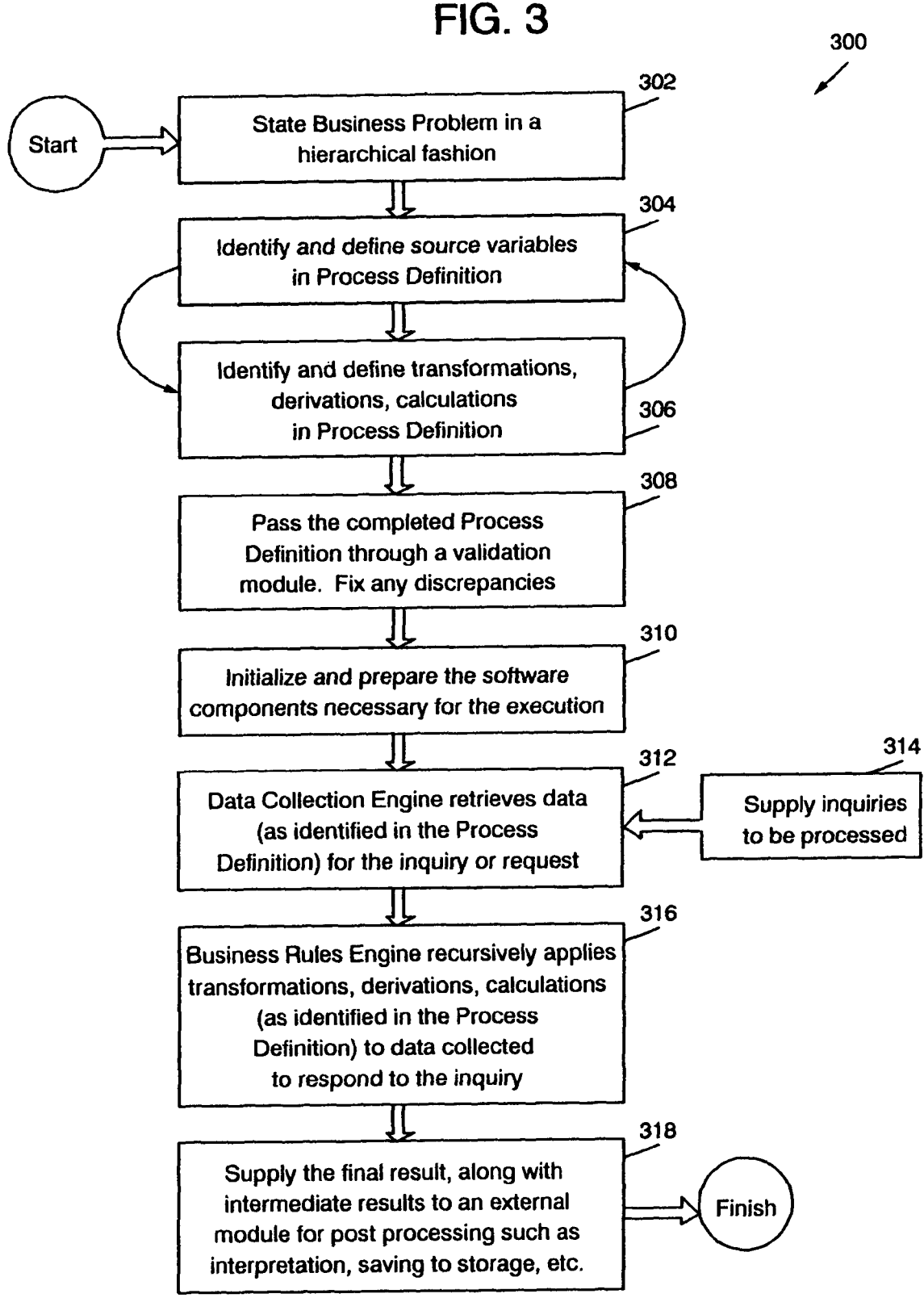
FIG. 3 is a flow chart of a method to retrieve and analyze data in accordance with an embodiment of the present invention.

FIG. 3 is a flow chart of a method 300 to retrieve and analyze data in accordance with an embodiment of the present invention. The method 300 may be performed by the system 100 of FIG. 1 and the system 200 of FIG. 2. The method 300 may be described as responding to a business inquiry or problem; although, the method 300 may be applicable to any type of inquiry or problem in other contexts or environments. In block 302, the problem or inquiry may be stated in a hierarchical fashion or formulated as a linear expression. The linear expression may be a polynomial expression or equation made up of terms that may also be linear functions of their input variable values. In block 304, variables or source variables may be identified and defined. The variables are related to the inquiry and may be defined in a process definition in a markup language, such as XML or the like. The process definition may identify the variable and what data may need to be retrieved and from what sources to determine values for the variable to respond to the inquiry. If the inquiry is to determine which customers may be interested in a particular retirement product, the age of each of the customers may be one of the variables. To determine the age, the method 300 may need to retrieve the customer's date of birth from a relational database or table containing this and other customer information. All of the atomic or base level data elements to respond to the inquiry may be identified and defined in a markup language process definition, such as an XML process definition. In block 306 any transformations, derivations or calculations to the retrieved data may also be identified and defined in the process definition. This may be a repetitive process with identifying and defining the source variables in block 304. As described above, one example of a transformation or calculation that may need to be performed and therefore provided in the process definition would be to determine the age of the customer based on the customer's date of birth and the current date. The present invention may utilize external resources to perform complex transformations and the details of such operations may be provided in the process definition.

A user interface, such as a graphical user interface (GUI) or the like, may be used to capture or enter a process definition. The user interface may be presented to a user on a display of a workstation, such as workstation 108 of FIG. 1 or similar device. The user interface may enable a user to capture or select data sources, extraction rules, business rules and the like visually. The information captured using the user interface may be translated by the invention or data collection engine to a markup language, such as XML.

In block 308, each of the completed process definitions may be passed through a validation module to fix any discrepancies. The process definitions may be checked or validated for completeness and accuracy. Errors such as ill-defined variables, non-existent tables or data sources or non-existent locations in tables or data sources, invalid operators, duplicate variables, invalid range limits, invalid time intervals and the like, may be caught and repaired. In block 310, the software components of the system, such as system 100 of FIG. 1 or 200 of FIG. 2, that may be needed to respond to the inquiry may be initialized and prepared. External parameters may be read into the system, the process definition document may be parsed and any necessary internal objects may be created. Multiple threads of execution may be created for the data collection engine and rules engine. Based on the markup language definitions, templates for objects, such as variables, transformation rules, prepared statements for structured query language (SQL) query execution and the like may be created. Application of the invention may involve acquiring large amounts of data or data objects to be placed in the ready to compute queue 110 (FIG. 1) or 212 (FIG. 2).

In block 312, a data collection engine may retrieve the selected data as identified in the process definition to respond to the inquiry or request. The data collection engine may be similar to data collection engine 102 (FIG. 1) or 202 (FIG. 2). In block 316 the rules engine or business rules engine may include a data structure to recursively apply predetermined functions, such as transformations, derivations, calculations and the like, as defined in the process definitions, to the selected data to respond to the inquiry or request. The rules engine may be similar to the rules engines 112 and 210 of FIGS. 1 and 2 respectively. In block 318, the results from the rules engine may be supplied, along with any intermediate results that may be used or needed, to an external module for post processing. The post processing module may be similar to module 218 in FIG. 2. As previously described, the post processing may include interpreting the results to fit the inquiry, formulating a business entity or customer list in a particular order based on the results, storing the results for further processing or other operations.

Elements of the method 300 may be embodied in a computer program product on a computer-usable or computer readable-medium or electronic readable medium 118 (FIG. 1), such as a memory, disk drive or the like, having computer-executable instructions for performing the method 300. The computer-usable or computer readable medium may include, for example, any electronic, magnetic, optical, infrared or semiconductor system or the like. The medium may also be a stream of information being retrieved when the computer program product is downloaded through a network such as the Internet or the like. The computer-usable or computer readable medium could also be paper or other suitable medium upon which a program may be printed. The appendix to this application includes examples of source code that may be used to implement features of the method 300.

Figure 4:
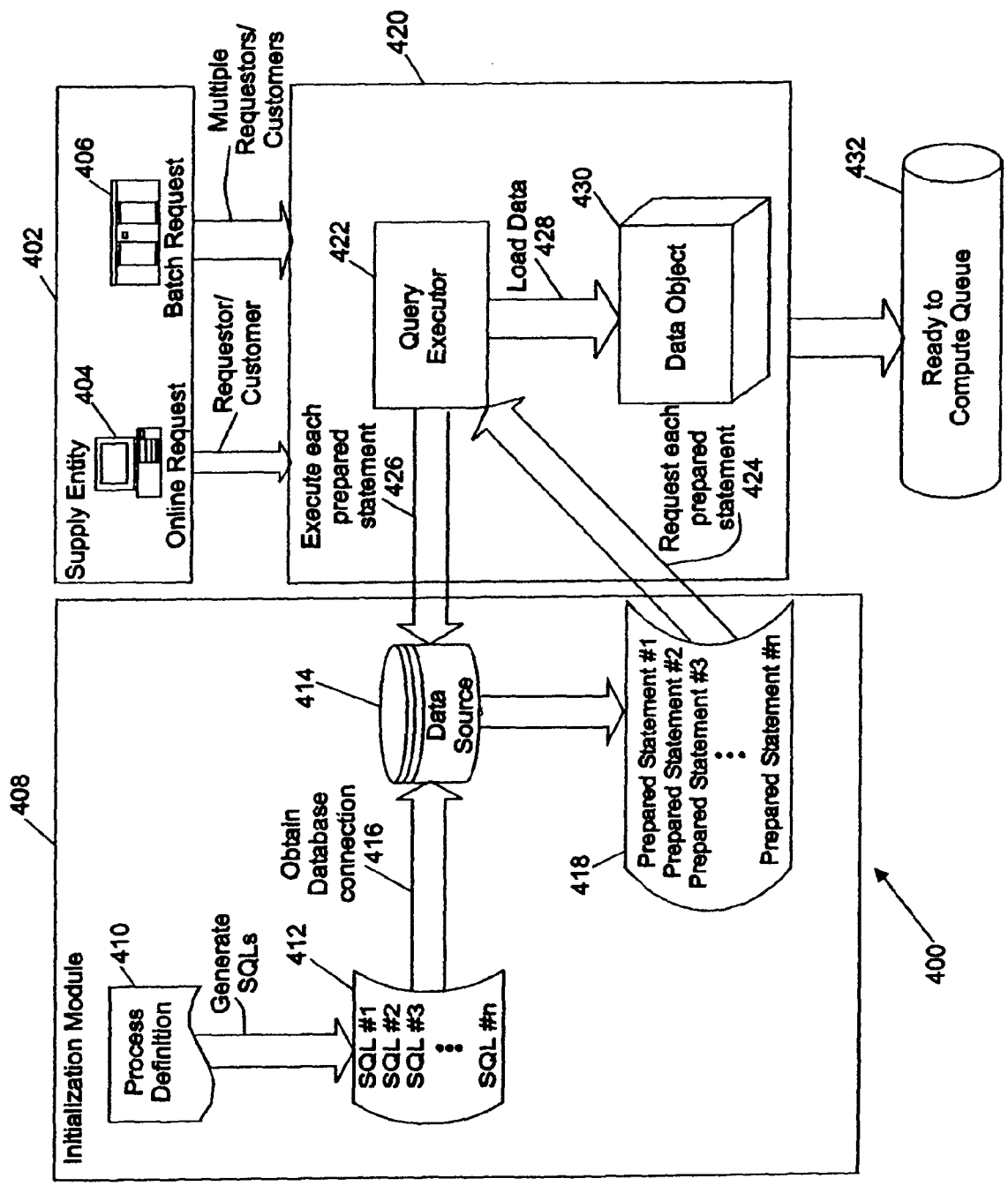
FIG. 4 is a block diagram of a system to retrieve data in accordance with an embodiment of the present invention.

FIG. 4 is a block diagram of an example of a system or 400 to retrieve data in accordance with an embodiment of the present invention. The system 400 may be part of the system 100 of FIG. 1 or system 200 of FIG. 2. A supply entity 402 may provide inquiries such as inquiries 104 of FIG. 1 or requests. The inquiries may be from a single requestor, business entity or customer, such as an online request 404 or the like, or the inquiries may be in the form of a batch request 406 involving multiple requestors, business entities or customers. The supply entity 402 may not necessarily be considered to be part of the system 400 but may merely illustrate how requests or inquiries may enter the system 400 for purposes of explanation.

The system 400 may include an initialization module 408. The initialization module 408 may perform the initialization and preparation of software components described with respect to block 310 of FIG. 3. In the initialization module 408, process definitions 410 in a markup language, such as XML or the like, may generate and store or cache SQL queries 412 to retrieve selected data from one or more data sources 414 related to an inquiry made by one of the supply entities 402. The SQL queries 412 may obtain connection, as indicated by arrow 416, to the appropriate data source 414 or data sources to retrieve the selected data to respond to the inquiry or request. A series of prepared statements 418 may be created and stored or cached by the data source 414 or data source management system associated with the data source 414 in the initialization module 408. A prepared statement 418 corresponding to each SQL 412 may be prepared. Each prepared statement 418 may be a specific type of object contained in a particular vendor's relational database or data source management system product. The prepared statements 418 may be dynamic in nature and may exist only as long as the process that created the object or statement 418 maintains a connection to the data source 414. Each prepared statement 418 may represent a compiled and executable version of a particular form of an SQL text statement 412. The prepared statements 418 may be reusable and may provide an opportunity for optimization by a relational database management system's compiler and optimization of path selection functions to efficiently retrieve the selected data.

The system 400 may also include a data collection engine 420 that may be used for the data collection engines 102 and 202 in FIGS. 1 and 2 respectively. The data collection engine 420 may perform the functions described with respect to block 312 in FIG. 3. The data collection engine 420 may include a query executor 422 to request each prepared statement 418, as indicated by arrow 424, and to execute each prepared statement 418, as indicated by arrow 426, to retrieve the selected data related to an inquiry from one of the supply entities 402. The selected data retrieved by the query executor 422 may be loaded, as indicated by arrow 428, into a data object 430 by the query executor 422. The data object 430 may be loaded into a ready to compute queue 432 that may be the same as ready to compute queues 110 and 212 in FIGS. 1 and 2 respectively. The appendix to this application includes examples of source code that may be used to implement features of the system 400.

Figure 5:
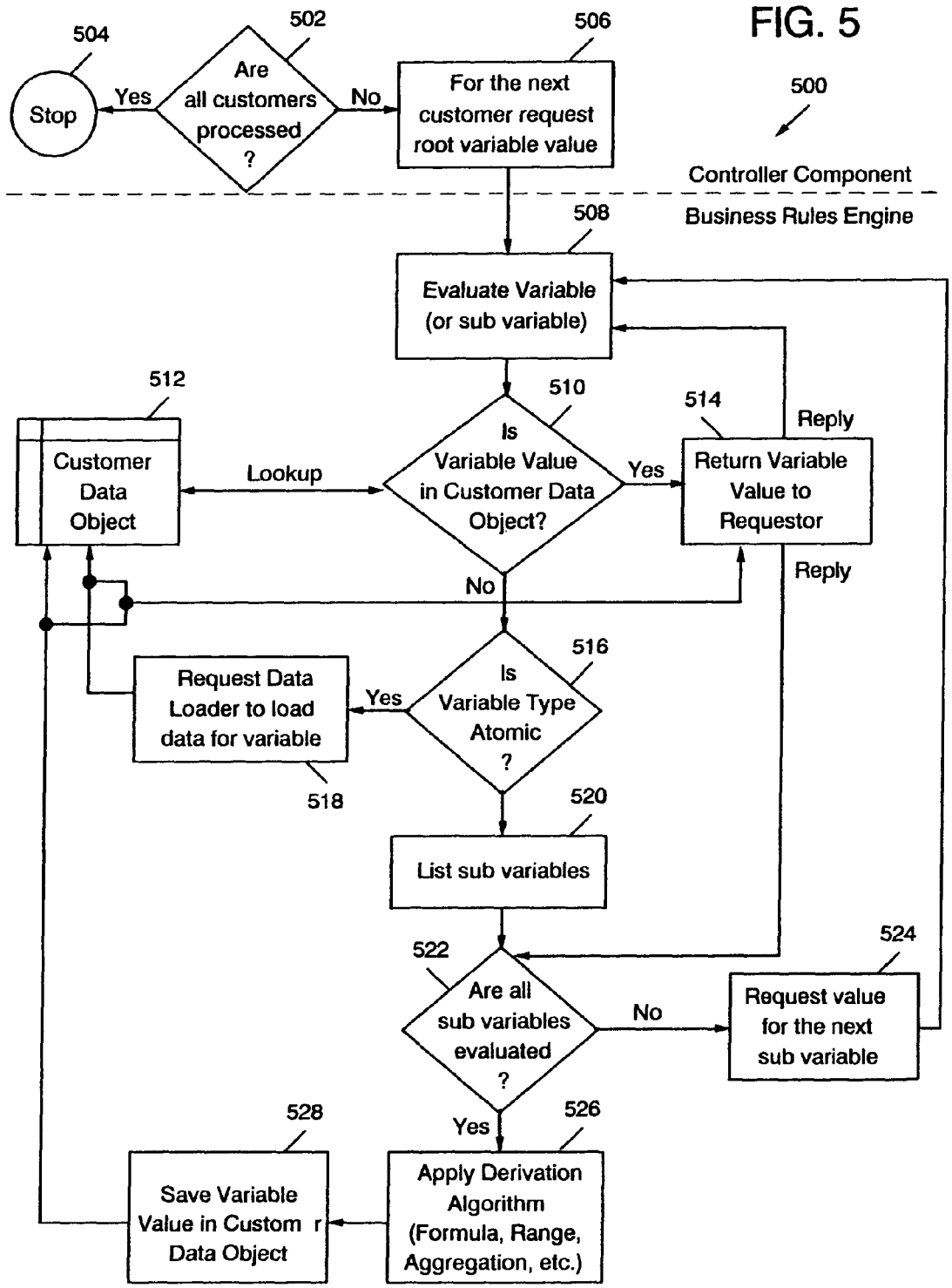
FIG. 5 is a flow chart of a method to analyze data in accordance with another embodiment of the present invention.

FIG. 5 is a flow chart of a method 500 to analyze data in accordance with another embodiment of the present invention. The method 500 may be performed by each of the rules engines 112 and 210 of FIGS. 1 and 2 respectively. In block 502, a determination may be made if all customers or entities have been processed or if all variable values have been determined for all customers or entities related to an inquiry or problem. If all customers or entities have been processed or all variable values have been determined, the method 500 may stop at termination 504. If all customers or entities have not been processed or variables related to an inquiry or problem have not been determined, the method 500 may advance to block 506. In block 506, a root variable may be requested for the next customer or entity related to the inquiry or problem. A root variable may be a variable that is derived and that may be at the top of a given process' variable hierarchy. Blocks 502 and 506 may be performed by a controller component that may be the same as the controller component 114 in FIG. 1.

In block 508 a variable or sub-variable related to an inquiry may be evaluated to determine a value of the variable or sub-variable. A sub-variable may be a variable that in combination with other sub-variables may form or define a derived variable or root variable. In block 510, a determination may be made if a variable value or sub-variable value is in a data object, such as a business entity or customer data object or the like. If the variable value or sub-variable value is in a data object, the variable value may be looked up in a data object cache 512 and the variable value or sub-variable value may be returned to a requestor in block 514. If the variable value is a sub-variable value, the method 500 may advance to block 522 as described below. If the variable value is not in a data object in block 510, a determination may be made in block 516 if the variable is an atomic variable. An atomic variable may be a basic or fundamental variable that may not need to be derived or transformed from other variables or sub-variables. In a variable hierarchy, the atomic variables would reside at the bottom or base of an "inverted tree structure" forming the variable hierarchy and may be referred to as "leaves" or "leaf nodes." At the top of the variable hierarchy may be the root variables that may be derived from other variables. Between the root and leaf variables may be any number of derived variables that may be referred to as "branches" of the inverted tree structure.

If the variable is determined to be an atomic variable in block 516, the selected data or the value of the variable may be loaded in the table or cache 512 by a data loader or the like in block 518. The data loader may be the same as the data collection engine 102, 202, 312 and 420 in FIGS. 1-4 respectively. The variable value may also be returned to the requestor in block 514. If the variable is not an atomic variable in block 516, a list of sub-variables that may be needed to derive the variable may be formed in block 520. In block 522 a determination may be made if all sub-variables have been evaluated. If all sub-variables have not been evaluated, an evaluation for the value for the next sub-variable may be requested in block 524 and the method 500 may return to block 508 to evaluate the next sub-variable and the method 500 will proceed as previously described. If all sub-variables have been evaluated in block 522 any derivation algorithm, such as a formula, range, aggregation or other operation or function, that needs to be performed on the sub-variable values to provide the variable value may be performed in block 526. In block 528, the variable value may be saved in a data object, such as a business entity or customer data object or the like, and stored in the table or cache 512. The variable value from block 528 may also be returned to the requestor in block 514.

Elements of the method 500 may be embodied in a computer-usable or computer-readable medium or electronic readable medium, such as the medium 118 (FIG. 1) or the like, having computer-usable or computer-executable instructions for performing the method 500. The computer readable medium may, for example, include any electronic, magnetic, optical, electromagnetic, infrared or semiconductor system or the like. The medium may also be a stream of information being retrieved when the computer program product is downloaded through a network such as the Internet. The computer-usable or computer-readable medium could also be paper or other suitable medium upon which a program may be printed. The appendix of this application includes examples of source code that may be used to implement features of the method 500.

Figure 6:
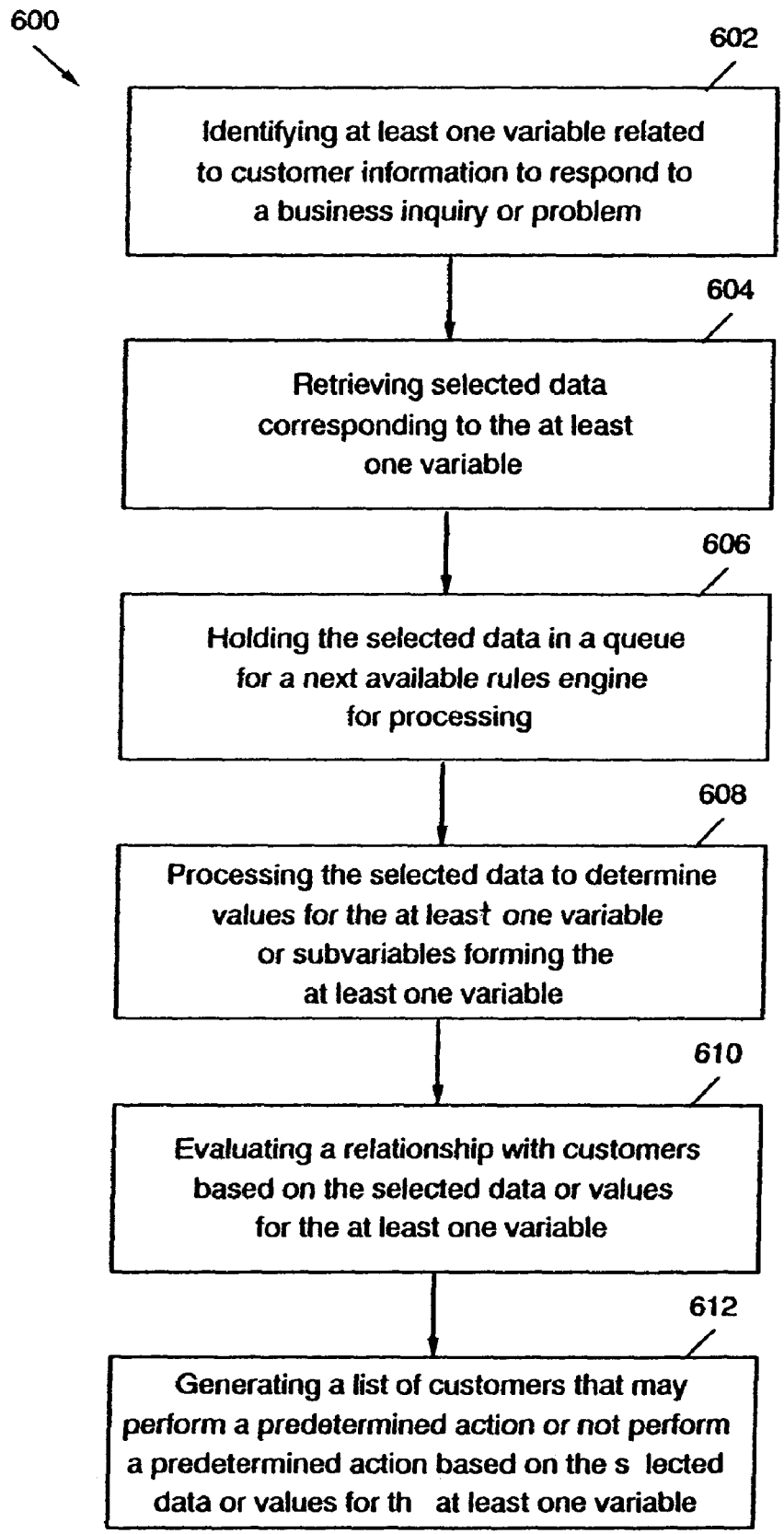
FIG. 6 is a flow chart of a method to retrieve and analyze data related to a business inquiry or problem in accordance with an embodiment of the present invention.

FIG. 6 is a flow chart of a method 600 to retrieve and analyze data related to a business inquiry or problem in accordance with another embodiment of the present invention. The method 600 is an example of a business inquiry or problem that may be performed by the systems 100, 200 or 400 of FIGS. 1, 2 and 4 respectively. In performing the method 600 the systems 100, 200 or 400 may be performing the methods 300 and 500 of FIGS. 3 and 5 to respectively retrieve data related to the business inquiry and to evaluate variables as described with respect to method 500. In block 602, at least one variable related to business entity or customer information may be identified to respond to the business inquiry or problem. As an example, the business inquiry may include which customers or business entities may be interested in a particular product; what customers or business entities are likely to fall into a particular category; what is the level of customer or business entity satisfaction with certain services; what is the level of service for various customers or business entities; what retains customers or attracts customers or business entities; and the like. Examples of variables related to the business inquiries may include customer ages, customer income levels, own home or rent, date of first contact with the business, types of accounts, account balances, and the like. Other variables may involve demographics, and other statistical and non-statistical data or information. As previously described, at least one variable may be defined in a process definition in a markup language, such as XML or the like. In block 604, the selected data may be retrieved that corresponds to the at least one variable. As previously described, this may be done by formulating SQL queries from the markup language process definitions. The selected data may be a data object that may be held in a queue for a next available rules engine or business rules engine in block 606. In block 608, the selected data or data object may be processed to determine values for the at least one variable or sub-variables forming each variable. The processing may be done by a next available business rules engine. The business rules engine may be configurable to accommodate different types of inquiries or problems. The business rules engine may be the same as rules engine 112 or 214 in FIGS. 1 and 2 and may include a data structure to carry out the functions or operations described with respect to the method 500 of FIG. 5. In block 610, a relationship with customers may be evaluated based on the selected data or values for the at least one variable. In block 612, a list of customers that may perform a predetermined action or not perform a predetermined action may be generated. The list may be based on the selected data or values determined from the selected data for the at least one variable. The business rules engine may include a data structure to perform the operations in blocks 610 and 612 or to evaluate selected data related to some other business inquiry or problem. Alternatively, a post processing module, such as module 218 of FIG. 2 may include a data structure to perform the operations in blocks 610 and 612.

As an example, various pieces of information about customers' relationships with a bank or other business may be collected, such as types of accounts owned, balances held and the like. Additionally, information on recent customer behavior or demographics may be gathered. A known analytical technique, such as logistic regression may use the customer information collected to translate the information into a probability or score that may be used to determine which customers are most likely to purchase a particular product of interest.

Elements of the method 600 may be embodied in a computer program product or a computer-usable or computer-readable medium or electronic readable medium, such as the medium 118 (FIG. 1) or the like, having computer-usable or computer-executable instructions for performing the method 600. The computer-usable or readable medium may, for example, include any electronic, magnetic, optical, electromagnetic, infrared or semiconductor system or the like. The medium may also be a stream of information being retrieved when the computer program product is downloaded through a network such as the Internet. The computer-usable or computer-readable medium could also be paper or other suitable medium upon which a program may be printed. The appendix of this application includes examples of source code that may be used to implement features of method 600.

Elements of the present invention may be embodied in hardware and/or software as a computer program code that may include firmware, resident software, microcode or the like. Additionally, elements of the invention may take the form of a computer program product on a computer-usable or computer-readable storage medium, such as medium 118 in FIG. 1, having computer-usable or computer-readable program code embodied in the medium for use by or in connection with a system, such as system 100, 200 or 400 of FIGS. 1, 2 and 4 respectively. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. For example, the systems and methods of the present invention may be used for statistical model implementations, evaluation of behavioral statistics, different types of modeling, such as tree modeling, cluster modeling, regression modeling, association modeling, sequence modeling, Naive Bayes modeling and the like. The systems and methods of the present invention may also be used for risk or insurability calculations, forecasting, event detection, what-if scenario analysis, business needs assessment, customer or business entity needs assessment, business metrics measurement, operational measurement or the like. This application is intended to cover any adaptations or variations of the present invention. The following claims are in no way intended to limit the scope of the invention to the specific embodiments described herein.

What is claimed is:

1. A system to retrieve and analyze data, comprising:
 a computer hardware processing device configured to execute at least one data collection engine to retrieve selected data from at least one data source, wherein the selected data comprises a date, the selected data being related to an inquiry received from a requestor;
 a computer hardware processing device configured to execute at least one rules engine to apply predetermined functions to the selected data to respond to the inquiry and to return a result to the requestor, wherein the date is used to determine a variable related to the inquiry, wherein the at least one data collection engine and the at least one rules engine is executed by the same computer hardware processing device or separate computer hardware processing devices; and
 wherein the rules engine is configured to determine whether the variable is an atomic variable or includes sub-variables, wherein the variable is assigned to a customer as a variable value when the variable is atomic, and wherein the sub-variables are evaluated to determine the variable value to assign to the customer when the variable includes sub-variables;
 a ready to compute queue disposed between the at least one data collection engine and the at least one rules engine such that after the at least one data collection engine retrieves the selected data, but prior to the selected data being processed by a next available rules engine, the at least one data collection engine stores the selected data in the ready to compute queue to be processed by the next available rules engine;
 a validation module configured to identify and correct discrepancies in the selected data; and
 at least one post processor to process results from the at least one rules engine to formulate a customer list of the customers in a particular order based on the variable value, wherein the variable value is determined based at least in part on the date received from the selected data.

2. The system of claim 1, wherein the at least one data collection engine generates a data object in response to each variable.

3. The system of claim 2, wherein the inquiry is related to a business inquiry or problem.

4. The system of claim 2, wherein each variable is defined in a process definition, wherein the process definition comprises an identity of each variable, what data needs to be retrieved for each variable, and from what source a value for each variable is retrievable.

5. The system of claim 4, wherein each process definition is embodied in a markup language to generate structured query language (SQL) queries to retrieve the selected data.

6. The system of claim 1, further comprising an initialization module including a process definition to generate and store a plurality of queries to retrieve the selected data related to the inquiry, wherein the process definition comprises business rules formed as at least one of derivations, transformations, calculations and aggregations to be performed on at least one variable by the at least one business rules engine.

7. The system of claim 6, wherein the process definition comprises a collection of related variable definitions.

8. The system of claim 1, further comprising at least one variable related to customer information to respond to a business inquiry or problem, wherein the data collection engine generates a data object in response to each variable for each customer related to the inquiry.

9. The system of claim 1, wherein the data collection engine comprises a query executor to generate a data object in response to the variable.

10. The system of claim 1, wherein the rules engine comprises a data structure to evaluate atomic variables or sub-variables forming a variable.

11. The system of claim 10, wherein the rules engine generates a data object for each evaluated atomic variable or sub-variable.

12. The system of claim 10, wherein the rules engine comprises a data structure to store a variable value in a data object.

13. The system of claim 1, wherein the rules engine comprises a data structure to recursively apply the predetermined functions to the selected data.

14. The system of claim 13, wherein the predetermined functions comprise at least one of transformations, derivations and calculations as defined in a process definition.

15. The system of claim 14, wherein the process definition is defined in a markup language.

16. The system of claim 1, wherein the data collection engine and the rules engine are configured to operate in response to an online request and a batch request.

17. A system to retrieve and evaluate data, comprising:
at least one computer hardware processing device configured to execute a plurality of data collection engines, wherein the plurality of data collection engines are configured to retrieve selected data from at least one data source, wherein the selected data comprises a date, the selected data being related to an inquiry received from a requestor;
at least one computer hardware processing device configured to execute a plurality of rules engines to evaluate the selected data to respond to the inquiry and return a result to the requestor, wherein the date is used to determine a variable related to the inquiry, wherein any data collection engine is executed by the same computer hardware processing device as any rules engine or is executed by separate computer hardware processing devices as any of the rules engine;
wherein the rules engine is configured to determine whether the variable is an atomic variable or includes sub-variables, wherein the variable is assigned to a customer as a variable value when the variable is atomic, and wherein the sub-variables are evaluated to determine the variable value to assign to the customer when the variable includes sub-variables;
a ready to compute queue disposed between the plurality of data collection engines and the plurality of rules engines such that after the plurality of data collection engines retrieves the selected data, but prior to the selected data being processed by a next available rules engine, the plurality of data collection engines stores the selected data in the ready to compute queue to be processed by the next available rules engine;
a validation module configured to identify and correct discrepancies in the selected data; and
at least one post processor to process results from the at least one rules engine to formulate a customer list in a particular order based on the variable value, wherein the variable value is determined based at least in part on the date received from the selected data.

18. The system of claim 17, wherein the inquiry is related to a business inquiry or problem.

19. The system of claim 18, wherein each rules engine comprises a data structure to evaluate a business inquiry or problem or a relationship with a customer or business entity from the selected data.

20. The system of claim 17, wherein each rules engine comprises a data structure to evaluate the selected data to determine a predetermined action by a customer.

21. The system of claim 17, further comprising structured query language (SQL) queries that are generated and cached in response to receiving the inquiry.

22. The system of claim 17, wherein each rules engine is configured to accommodate different types of inquiries.

23. The system of claim 17, further comprising a cache associated with each rules engine to store data objects to be used in different operations or inquiries.

24. A method to retrieve and analyze data, comprising:
retrieving selected data related to an inquiry from at least one data source, wherein the selected data comprises a date;
holding the selected data in a ready to compute queue disposed between at least one data collection engine and at least one rules engine such that after the at least one data collection engine retrieves the selected data, but prior to the selected data being processed by a next available rules engine, the at least one data collection engine stores the selected data in the ready to compute queue for processing by the next available rules engine;
evaluating a relationship between a business and a plurality of customers in the next available rules engine based on the selected data, wherein the date is used to determine a variable related to the inquiry;
wherein the rules engine is configured to determine whether the variable is an atomic variable or includes sub-variables, wherein the variable is assigned to a customer as a variable value when the variable is atomic, and wherein the sub-variables are evaluated to determine the variable value to assign to the customer when the variable includes sub-variables;
validating the selected data to identify and correct discrepancies;
generating, by a computing hardware processing device, a list of customers in a particular order based on the variable value, wherein the variable value is determined based at least in part on the date received from the selected data.

25. The method of claim 24, further comprising formulating the inquiry in a hierarchical structure.

26. The method of claim 24, further comprising identifying variables related to the inquiry.

27. The method of claim 26, further comprising defining each variable in a process definition.

28. The method of claim 27, further comprising passing the process definition through a validation module to correct any discrepancies.

29. The method of claim 27, further comprising embodying the process definition in a markup language to generate structured query language (SQL) queries to retrieve the selected data.

30. The method of claim 24, further comprising forming business rules to operate on the retrieved data or on data to which the predetermined functions have been applied.

31. The method of claim 30, further comprising forming the business rules in a markup language.

32. The method of claim 30, further comprising applying the business rules in the rules engine to operate on the data.

33. The method of claim 24, further comprising:
generating a data object in response to the variable.

34. The method of claim 24, further comprising saving each variable value to be used by other operations or in other inquiries.

35. The method of claim 24, further comprising configuring the rules engine to accommodate different types of inquiries.

36. The method of claim 24, further comprising generating and caching structured query language (SQL) queries to retrieve the selected data in response to the inquiry being submitted.

37. The method of claim 24, further comprising operating in an online mode and a batch mode.

38. The method of claim 24, further comprising caching data objects to be used in other operations or inquiries.

39. The method of claim 24, further comprising applying predetermined functions in Reverse Polish Notation.

40. The method of claim 24, further comprising applying predetermined functions as a hierarchical evaluation.

41. The method of claim 24, further comprising supplying results and any intermediate results to an external module for post processing.

42. A method to retrieve and analyze data, comprising:
identifying at least one variable related to information to respond to an inquiry or problem;
generating at least one query from a process definition;
generating a prepared statement corresponding to the at least one query;
retrieving selected data related to the at least one variable by executing the prepared statement, wherein the selected data comprises a date;
holding, by a computer, the selected data in a ready to compute queue disposed between at least one data collection engine and at least one rules engine such that after the at least one data collection engine retrieves the selected data, but prior to the selected data being processed by a next available rules engine, the at least one data collection engine stores the selected data in the ready to compute queue for processing by the next available rules engine; and
wherein the rules engine is configured to determine whether the variable is an atomic variable or includes sub-variables, wherein the variable is assigned to a customer as a variable value when the variable is atomic, and wherein the sub-variables are evaluated to determine the variable value to assign to the customer when the variable includes sub-variables;
processing the date to determine the variable values for the at least one variable;
validating the selected data to identify and correct discrepancies; and
processing results from the at least one rules engine in at least one post processor to formulate a customer list in a particular order based on the variable value, wherein the variable value is determined based at least in part on the date received from the selected data.

43. The method of claim 42, wherein identifying the at least one variable comprises identifying at least one variable related to information to respond to a business inquiry or problem.

44. The method of claim 43, wherein identifying the at least one variable comprises identifying at least one variable related to customer or entity information to respond to the business inquiry or problem.

45. The method of claim 44, further comprising evaluating a relationship with a customer based on the selected data.

46. The method of claim 45, wherein evaluating a relationship with a customer comprises determining a predetermined action by the customer.

47. The method of claim 42, further comprising generating a user interface for a user to capture or enter information related to the inquiry or problem, wherein the information comprises at least one of a process definition, data source information, extraction rule information and business rule information.

48. The method of claim 42, further comprising converting any information to a markup language.

49. A non-transitory computer-readable medium having computer-executable instructions that, when executed on a computer, perform a method, the method comprising:
generating a plurality of queries from a process definition;
generating a prepared statement corresponding to each query;
executing, by a computer hardware processor, each prepared statement to retrieve selected data related to an inquiry from at least one data source, wherein the selected data comprises a date;
holding the selected data in a ready to compute queue disposed between a data collection engine and a rules engine such that after the at least one data collection engine retrieves the selected data, but prior to the selected data being processed by a next available rules engine, the at least one data collection engine stores the selected data in the ready to compute queue for processing by the next available rules engine;
wherein the rules engine is configured to determine whether the variable is an atomic variable or includes sub-variables, wherein the variable is assigned to a customer as a variable value when the variable is atomic, and wherein the sub-variables are evaluated to determine the variable value to assign to the customer when the variable includes sub-variables;
applying predetermined functions to the date for analysis;
validating the selected data to identify and correct discrepancies; and
processing results from the at least one rules engine using a post processor to formulate a customer list in a particular order based on the variable value, wherein the variable value is determined based at least in part on the date received from the selected data.

50. The non-transitory computer readable medium having computer-executable instruction for performing the: method of claim 49, further comprising generating and caching structured query language (SQL) queries to retrieve the selected data in response to the inquiry being submitted.

51. The non-transitory computer readable medium having computer-executable instruction for performing the method of claim 49, further comprising retrieving the selected data related to customer information to respond to a business inquiry or problem.

52. The non-transitory computer readable medium having computer-executable instruction for performing the method of claim 51, further comprising evaluating a relationship with the customer based on the selected data.

53. The non-transitory computer readable medium having computer-executable instruction for performing the method of claim 52, further comprising generating a list of customers expected to perform a predetermined action or not perform the predetermined action based on the selected data.

54. The system of claim 1, further comprising a controller disposed between the ready to compute queue and the at least one rules engine to monitor and control transfer of the selected data from the ready to compute queue to the at least one rules engine.

* * * * *